(12) United States Patent
Boos et al.

(10) Patent No.: US 9,274,522 B2
(45) Date of Patent: Mar. 1, 2016

(54) METHOD FOR CONTROLLING THE DRIVING OF A BIG RIG AND DRIVE CONTROL SYSTEM

(71) Applicant: ZF LENKSYSTEME GMBH, Schwaebisch Gmuend (DE)

(72) Inventors: Nicolas Boos, Mutlangen (DE); Roland Greul, Schwaebisch Gmuend (DE); Alexander Gaedke, Mutlangen (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 6 days.

(21) Appl. No.: 14/288,775

(22) Filed: May 28, 2014

(65) Prior Publication Data

US 2015/0198949 A1 Jul. 16, 2015

(30) Foreign Application Priority Data

Jan. 14, 2014 (DE) .......................... 10 2014 100 332

(51) Int. Cl.
| | |
|---|---|
| *G05D 1/00* | (2006.01) |
| *B62D 13/06* | (2006.01) |
| *B62D 15/02* | (2006.01) |
| *G06F 3/0484* | (2013.01) |
| *G06F 3/0488* | (2013.01) |
| *B62D 1/00* | (2006.01) |

(52) U.S. Cl.
CPC ................ *G05D 1/0044* (2013.01); *B62D 1/00* (2013.01); *B62D 13/06* (2013.01); *B62D 15/0285* (2013.01); *G06F 3/04847* (2013.01); *G06F 3/04883* (2013.01)

(58) Field of Classification Search
CPC ......... B60R 1/025; B60T 1/005; B60T 1/067; B60T 7/16; G01S 13/04
USPC ................ 701/2, 36, 41, 49, 50; 340/995.28; 359/843; 172/4.5, 9
See application file for complete search history.

(56) References Cited

U.S. PATENT DOCUMENTS

| | | | | |
|---|---|---|---|---|
| 6,592,230 | B2 * | 7/2003 | Dupay ........................... | 359/839 |
| 2005/0128060 | A1 * | 6/2005 | Rennick et al. ............... | 340/435 |
| 2005/0131603 | A1 * | 6/2005 | Liu et al. ........................ | 701/36 |

FOREIGN PATENT DOCUMENTS

| | | |
|---|---|---|
| DE | 103 22 828 | 1/2005 |
| DE | 10 2005 045 196 | 9/2006 |
| DE | 10 2005 056 462 | 5/2007 |
| DE | 10 2006 002 294 | 7/2007 |
| DE | 10 2008 004 158 | 8/2009 |
| DE | 10 2012 007 986 | 10/2013 |
| GB | 2 398 048 | 8/2004 |

* cited by examiner

*Primary Examiner* — Gertrude Arthur Jeanglaude
(74) *Attorney, Agent, or Firm* — Jordan and Hamburg LLP

(57) ABSTRACT

A method for remotely controlling a big rig comprises a tractor unit and one or more trailers coupled to the tractor unit, wherein the tractor unit comprises a drive train which can be electronically actuated by the control of the tractor unit and by way of which the tractor unit can be driven automatically. The control of the tractor unit have a wireless communication link to a touchscreen device so that automatic driving of the big rig can be remotely controlled by way of the touchscreen device during which at least one articulation angle between a longitudinal axis of the tractor unit and a longitudinal axis of the trailer is continuously regulated.

20 Claims, 1 Drawing Sheet

METHOD FOR CONTROLLING THE DRIVING OF A BIG RIG AND DRIVE CONTROL SYSTEM

BACKGROUND OF THE INVENTION

The invention relates to a method for controlling the driving of a big rig comprising a tractor unit and one or more trailers coupled to the tractor unit. The invention likewise relates to a touchscreen device and to a drive control system for a big rig.

A variety of methods exist to assist a driver with maneuvering a vehicle, in particular a motor vehicle, having no trailer. Some methods broaden the field of vision of the driver by way of park distance control systems, cameras or the like. In other methods, individual driving tasks are taken over from the driver during maneuvering, in particular when parking the vehicle in parking spaces. If the driver and the vehicle also share the longitudinal and transverse guidance of the vehicle in a parking steering system, the entire task of driving is taken over from the driver during autonomous parking. The driver is then only responsible for activating and deactivating the parking process.

Methods are also known already for assisting the driver with the maneuvering of a big rig comprising a tractor unit and a trailer.

DE 10 2005 045 196 A1 relates to a device for assisting the driver of a tractor unit during back-up maneuvers of a big rig composed of a tractor unit and a trailer coupled to the tractor unit. The device comprises the following components: a camera, which can be mounted in the rear area of the trailer and by way of which an image of a surroundings area of the trailer located in the reverse driving direction can be captured; a steering angle sensor, by way of which a wheel steering angle of steerable wheels of the tractor unit can be detected; and/or an articulation angle sensor, by way of which an articulation angle between the longitudinal axes of the traders and of the vehicle can be detected; and a simulation computer, in which a trajectory of at least one reference point of the trailer can be calculated from the wheel steering angle and/or the articulation angle; and a display device, by way of which the camera image can be represented; wherein the trajectory of the reference point of the trailer calculated by way of the simulation computer can be superimposed on the camera image.

In GB 2 398 048 A the surroundings of a big rig are detected by way of a camera which indicates to the driver, on a touchscreen device, what kind of steering is required to reach a selected target position.

Moreover, DE 103 22 828 A1 relates to a control system for a big rig comprising a tractor unit and a trailer, wherein the tractor unit is equipped with an electronically actuatable drive train.

Known methods for assisting the driver in the maneuvering of a big rig generally focus only on one of the two challenges that exist when backing up a trailer, these being either the limited view or the complex transverse dynamics. In addition, the majority of existing methods have the drawback that the trailer must be equipped with an additional sensor system (such as cameras or the like), which results in increased manufacturing costs.

SUMMARY OF THE INVENTION

Proceeding from this, it is the object of the present invention to create a method for controlling the driving of a big rig of the type mentioned at the outset, which avoids the disadvantages of the prior art, in particular at least makes it easier for the driver to take the complex transverse dynamics into consideration, and grants the driver optimal view of the surroundings of the big rig so that he is not dependent on additional sensors or actuators of the trailer, but manages with the existing sensors and actuators of the tractor unit.

This object is achieved according to the invention by a method for controlling the driving of a big rig comprising a tractor unit, in particular a tractive motor vehicle, and one or more trailers coupled to the tractor unit, wherein the tractor unit comprises a drive train, which can be electronically actuated by control means of the tractor unit and by way of which the tractor unit can be driven automatically, and wherein the control means of the tractor unit have a wireless communication link to a touchscreen device so that automatic driving of the big rig can be remotely controlled by way of the touchscreen device, during which at least one articulation angle between a longitudinal axis of the tractor unit and a longitudinal axis of the trailer is continuously regulated.

In the method according to the invention, the driver advantageously remotely steers the big rig by way of a touchscreen device or a touchscreen unit, in particular a smart phone, tablet PC or the like. Since he is able to leave the tractor unit and control the big rig from outside, he can gain an optimal overview of the surroundings of the big rig during maneuvering. Additionally, the automatic regulation of the articulation angle relieves the driver of considering the complex transverse dynamics or considerably facilitates the same. Moreover, no additional sensor system or actuator system is required on the trailer. The method manages with the existing sensor system and actuator system of the tractor unit.

It is advantageous if the big rig is graphically represented on the touchscreen of the touchscreen device, in particular in a top view from above. The big rig, or a portion of the big rig, can be virtually represented on the touchscreen device, in particular stylistically, preferably from a bird's eye view, so as to facilitate the driver's orientation. The driver can thus easily align the touchscreen device so that the virtual big rig is aligned in accordance with the real big rig.

Prior to starting to drive, a driving direction and/or a driving speed of the big rig can be predefined on the touchscreen of the touchscreen device. Prior to starting to drive, it is thus possible for the driver to specify the driving direction (reverse or forward) and the driving speed by way of the touchscreen device.

The tractor unit can comprise at least one transceiver system, which is electrically connected to the control means of the tractor unit and which is suitable for communicating with a transceiver system of the touchscreen device.

It is advantageous if the graphical representation of the big rig on the touchscreen of the touchscreen device comprises at least one active part and at least one passive part. When the big rig is being backed up, the at least one active part on the touchscreen of the touchscreen device can be a trailer, and the at least one passive part can be the tractor unit, or a further trailer if multiple trailers are present in the big rig.

When the big rig is being driven forward, the at least one active part on the touchscreen of the touchscreen device can be tractor unit, and the at least one passive part can be at least one trailer.

When a user touches the at least one active part on the touchscreen of the touchscreen device, the touchscreen device can remotely control the control means of the tractor unit so that the big rig is set in motion in a predefined driving direction, in particular at a predefined driving speed.

By laterally displacing the at least one active part on the touchscreen of the touchscreen device, a user can predefine a lateral movement direction of the big rig, in particular in the form of a target articulation angle, in particular between the at least one active part and the at least one passive part, or the longitudinal axes thereof.

Thus, when the driver touches the active part of the big rig on the touchscreen (trailer for reverse and tractor unit for forward), the big rig is set in motion at the preselected driving speed, and by displacing the active part of the big rig, the driver can predefine the articulation angle, and thus the lateral movement direction.

A target articulation angle between the at least one active part and the at least one passive part can be calculated from a lateral position of the displaced active part on the touchscreen of the touchscreen device, applying: the lateral position of the displaced active part/maximal lateral position of the displaced active part=target articulation angle/maximal articulation angle. The target articulation angle can thus alternatively be calculated from the lateral position of the displaced active part of the big rig on the touchscreen device by keeping the ratio of the target articulation angle to the maximally allowed articulation angle identical to the ratio of the lateral position to the maximal lateral position.

During driving, a user can set a driving speed by longitudinally displacing the at least one active part on the touchscreen of the touchscreen device. The driver can thus only predefine the driving direction before starting to drive. During driving, the driver can then predefine or set the articulation angle by laterally displacing the active part of the big rig, and the driving speed by longitudinally displacing the active part of the big rig.

When the user no longer touches the at least one active part, the control means of the tractor unit can be actuated by the touchscreen device so that the tractor unit is stopped immediately. When the driver no longer touches the part of the active big rig on the touchscreen device, the big rig stops immediately, in particular for safety reasons.

These measures minimize the demands on the driver with regard to longitudinal dynamics, and notably transverse dynamics. The target articulation angle corresponds to the articulation angle set on the touchscreen device by displacement of the active part of the big rig and can thus be read.

The electronically actuatable drive train of the tractor unit can comprise at least one steering system, a brake system and a drive assembly.

The control means of the tractor unit can transmit at least one activation status to the touchscreen device. At least one predefined driving direction, a predefined driving speed, a target articulation angle and an activation status can be transmitted from the touchscreen device to the control means of the tractor unit. The touchscreen device thus sends at least the preselected driving direction (forward or reverse), the preselected driving speed, the target articulation angle and the activation status to the tractor unit. The vehicle sends at least the activation status to the touchscreen device. The preselected driving speed is set automatically by way of the drive assembly or the engine (such as electronic throttle control) and the brake system (such as ESP) of the tractor unit; alternatively, it is also possible to use only the brake and idle for this purpose. The preselected driving direction can be set automatically by way of the transmission of the tractor unit.

The at least one articulation angle can be regulated automatically while driving by way of a steering system of the electronically actuatable drive train of the tractor unit. The articulation angle can thus be set automatically by the steering system of the tractor unit (such as EPS/electric power steering or AFS/adaptive front steering). An algorithm can be used for this purpose, which is composed of pre-control to a stable articulation angle and regulation to the desired articulation angle, as is described in DE 10 2006 002 294 A1 for example.

The current articulation angle can be detected by a sensor. This can be carried out by way of a special trailer hitch comprising an articulation angle sensor system or an alternative sensor system (such as camera, radar, lidar, ultrasound, GSP receiver in trailer and tractor unit).

While the big rig is being driven, the at least one articulation angle can be limited so as to avoid a collision between the trailer and tractor unit and/or so as to avoid an articulation angle being reached which can no longer be reduced without altering the driving direction.

The big rig can comprise multiple trailers, wherein additionally at least one articulation angle between the longitudinal axes of the respective trailers that are coupled to each other can be continuously regulated when the big rig is driven automatically.

Optionally, collision of the tractor unit with an obstacle can be avoided during driving by way of the surroundings sensor system of the tractor unit (such as camera, radar, lidar, ultrasound or the like). In the event of an imminent collision, interruption or disturbance of the wireless connection, or failure of an actuator system that is required, the big rig can be immediately stopped. Optionally, additional information (such as actual and target variables, as well as warnings) can be represented for the driver on the touchscreen device and/or output via a speaker of the touchscreen device.

Disclosed is a touchscreen device for use in a method according to the invention and a drive control system for a big rig comprising a tractor unit and one or more trailers that are coupled to the tractor unit, in conjunction with a touchscreen device, which is configured for use in a method according to the invention.

Advantageous embodiments and refinements of the invention will be apparent from the dependent claims.

An exemplary embodiment of the invention will be described schematically hereafter based on the drawings.

DETAILED DESCRIPTION OF PREFERRED EMBODIMENTS OF THE INVENTION

Figure 1:
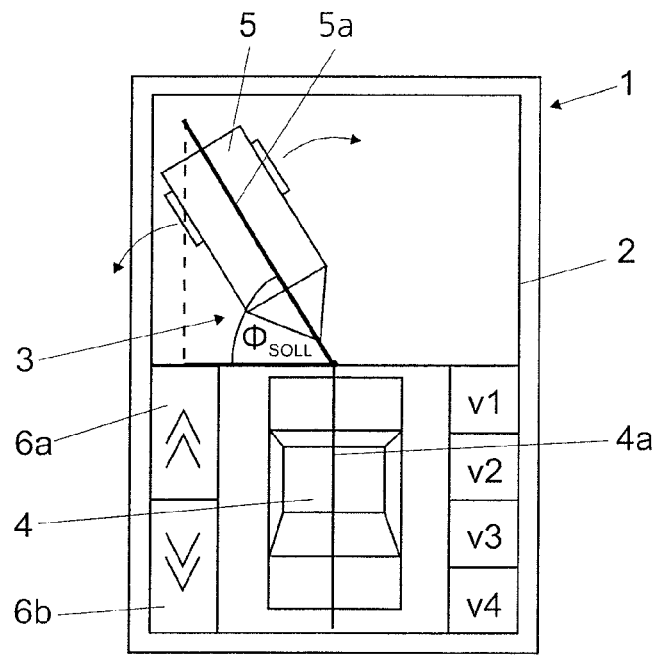
FIG. 1 shows a simplified illustration of a touchscreen device for use in a method according to the invention.

FIG. 1 shows a touchscreen device 1 including a touchscreen 2 for use in a method according to the invention for controlling the driving of a big rig 3 comprising a tractor unit 4, or tractive motor vehicle, and one or more trailers 5 coupled to the tractor unit 4.

The big rig 3 is graphically represented as a top view from above on the touch screen 2 of the touchscreen device 1.

The big rig 3 composed of the tractor unit 4 and the trailer 5 is virtually indicated only on the touchscreen 2 in the figures. The actual big rig to be remotely controlled is not shown in the figures.

In the method according to the invention, the tractor unit 4 comprises a drive train, which can be electronically actuated by control means of the tractor unit 4 and by way of which the tractor unit 4 can be driven automatically, wherein the control means of the tractor unit 4 have a wireless communication link to the touchscreen device 1, so that automatic driving of the big rig 3 can be remotely controlled by way of the touchscreen device 1, during which at least one articulation angle between a longitudinal axis 4a of the tractor unit 4 and a longitudinal axis 5a of the trailer 5 is continuously regulated. As is indicated in FIG. 1 by the areas 6a and 6b, a driving direction 6a, 6b of the big rig 3 can be predefined on the touchscreen 2 of the touchscreen device 1 prior to starting to drive. Moreover, driving speed levels of the big rig 2 can be predefined on areas v1 to v4 of the touchscreen 2.

The touchscreen device 1, in conjunction with the tractor unit 4 or the control means thereof, forms a drive control system for the big rig 3.

The tractor unit 4 comprises at least one transceiver system (not shown), which is electrically connected to the control means (not shown) of the tractor unit 4 and which is suitable for communicating with a transceiver system (likewise not shown) of the touchscreen device 1.

The graphical representation of the big rig 3 on the touchscreen 2 of the touchscreen device 1 includes an active part 5 and a passive part 4.

In the present example, the big rig 3 is being backed up, wherein the active part on the touchscreen 2 of the touchscreen device 1 is the trailer 5 and the passive part is the tractor unit 4. In a further exemplary embodiment, which is not shown, the at least one passive part can be a further trailer 5, if multiple trailers 5 are present.

Moreover, when the big rig 3 is being driven forward, the at least one active part on the touchscreen 2 of the touchscreen device 1 can be the tractor unit 4, and the at least one passive part can be the at least one trailer 5 (not shown).

When a user touches the active part 5 on the touchscreen 2 of the touchscreen device 1, the touchscreen 1 device remotely controls the control means of the tractor unit 4 so that the big rig 3 is set in motion in a predefined driving direction 6a, 6b, in particular at a predefined driving speed v1 to v4.

By laterally displacing the active part 5 on the touchscreen 2 of the touchscreen device 1, a user can predefine a lateral movement direction of the big rig 3, in particular in the form of a target articulation angle $\phi_{TARGET}$ between the active part 5 and the passive part 4. The target articulation angle $\phi_{TARGET}$ corresponds to the angle set on the touchscreen 2 by displacement of the active part 5 of the big rig 3 and can thus be read. The articulation angle that is defined is typically the angle between the longitudinal axes of the tractor unit 4 and of the at least one trailer 5. This definition is also used in the present invention. In the present exemplary embodiment, the target articulation angle $\phi_{TARGET}$ is indicated relative to a transverse axis of the tractor unit 4 and must therefore still be modified, which is to say increased by 90°, so as to arrive at the articulation angle.

Figure 2:
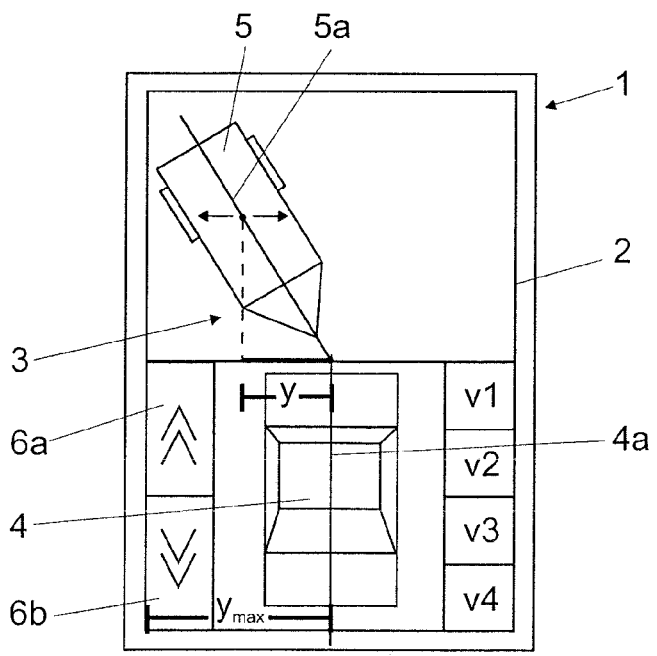
FIG. 2 shows another simplified illustration of the touchscreen device shown in FIG. 1.

As an alternative or in addition, the target articulation angle $\phi_{TARGET}$ between the active part 5 and the passive part 4 can be calculated from a lateral position y of the displaced active part 5 on the touchscreen 2 of the touchscreen device 1, wherein the following applies: lateral position y of the displaced active part 5/maximal lateral position $y_{max}$ of the displaced active part 5=target articulation angle $\phi_{TARGET}$/maximal articulation angle (see FIG. 2).

Functionally equivalent elements are denoted by identical reference numerals in FIGS. 1 and 2.

As an alternative or in addition, during driving, a user can set a driving speed by longitudinally displacing the at least one active part 5 on the touchscreen 2 of the touchscreen device 1.

If the user no longer touches the at least one active part 5, the control means of the tractor unit 4 are actuated by the touchscreen device 1 so that the tractor unit 4 is stopped immediately.

When a communication link is present between the control means of the tractor unit 4 and the touchscreen device 1, at least one activation status can be transmitted from the control means to the touchscreen device 1. At least one predefined driving direction 6a, 6b, a predefined driving speed v1 to v4, a target articulation angle $\phi_{TARGET}$ and an activation status can be transmitted from the touchscreen device 1 to the control means of the tractor unit 4.

The big rig 3 can comprise multiple trailers 5, wherein additionally at least one articulation angle between the longitudinal axes 5a of the respective trailers 5 that are coupled to each other can be continuously regulated while the big rig 3 is driven automatically. R is thus also possible to remotely control big rigs 3 comprising multiple trailers (such as the EuroCombi or the like). The control process could then be configured in such a way that the operator predefines the movement direction (transverse) of the big rig 3 by displacing the last trailer 5 when backing up, and by displacing the tractor unit 4 when driving forward. During backing up, the driver thus predefines the articulation angle between the last and second-to-last trailers 5, and the system sets all the articulation angles accordingly, so that the desired articulation angle is created between the last and second-to-last trailers 5.

The at least one articulation angle can be limited while the big rig 3 is being driven. In this way, a collision between the trailer 5 and tractor unit 4 can be effectively avoided. Moreover, it is also avoided that an articulation angle is reached which can no longer be reduced without altering the driving direction.

The at least one articulation angle can be regulated automatically during driving by way of a steering system of the electronically actuatable drive train of the tractor unit 4.

The method according to the invention and/or the drive control system allow the driver to remotely control the big rig by way of the touchscreen device 1, which can be implemented as a smart phone, tablet PC or the like, for example. Since the driver leaves the tractor unit and controls the big rig from outside, he can gain an optimal overview of the surroundings of the big rig during maneuvering. So as to facilitate the driver's orientation, a big rig 3, or a portion of a big rig 3, is virtually or stylistically represented from a bird's eye view on the touchscreen 2. The driver can thus easily align the touchscreen device 1, so that the virtual big rig 3 is aligned the same way as the real big rig (not shown). This enables safe and convenient maneuvering of the big rig.

LIST OF REFERENCE NUMERALS AND SYMBOLS

1 touchscreen device
2 touchscreen
3 big rig
4 tractor unit
4a longitudinal axis of the tractor unit
5 trailer
5a longitudinal axis of the trailer
6a, 6b areas for movement direction
v1 to v4 speed levels
$\phi_{SPECIFIED}$ target articulation angle
y lateral position of the active part
$y_{max}$ maximal lateral position of the active part

The invention claimed is:

1. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device, during which at least one articulation angle between a longitudinal axis of the tractor unit and a longitudinal axis of the trailer is continuously regulated.

2. The method according to claim 1, wherein the control means of the tractor unit transmit at least one activation status to the touchscreen device.

3. The method according to claim 1, wherein the at least one articulation angle is limited while the big rig is being driven.

4. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device, during which at least one articulation angle between a longitudinal axis of the tractor unit and a longitudinal axis of the trailer is continuously regulated, and
wherein the big rig is graphically represented on the touchscreen of the touchscreen device, in particular in a top view from above.

5. The method according to claim 4, wherein the graphical representation of the big rig on the touchscreen of the touchscreen device comprises at least one active part and at least one passive part.

6. The method according to claim 5, wherein, when the big rig is being backed up, the at least one active part on the touchscreen of the touchscreen device is a trailer, and the at least one passive part is the tractor unit, or a further trailer if multiple trailers are present.

7. The method according to claim 5, wherein, when the big rig is being driven forward, the at least one active part on the touchscreen of the touchscreen device is the tractor unit, and the at least one passive part is at least one trailer.

8. The method according to claim 5, wherein, when a user touches the at least one active part on the touchscreen of the touchscreen device, the touchscreen device remotely controls the control means of the tractor unit so that the big rig is set in motion in a predefined driving direction, in particular at a predefined driving speed (v1 to v4).

9. The method according to claim 5, wherein a user predefines a lateral movement direction of the big rig, in particular in the form of a target articulation angle $\Phi_{TARGET}$ between the active part and the passive part, by laterally displacing the at least one active part on the touchscreen of the touchscreen device.

10. The method according to claim 5, wherein a target articulation angle $\Phi_{TARGET}$ between the active part and the passive part is calculated from a lateral position of the displaced active part on the touchscreen of the touchscreen device, and the following applies: lateral position (y) of the displaced active part/maximal lateral position $y_{max}$ of the displaced active part=target articulation angle $\phi_{TARGET}$/maximal articulation angle.

11. The method according to claim 5, wherein, during driving, a user sets a driving speed (v1 to v4) by longitudinally displacing the at least one active part on the touchscreen of the touchscreen device.

12. The method according to claim 5, wherein, when the user no longer touches the at least one active part, the control means of the tractor unit are actuated by the touchscreen device so that the tractor unit is immediately stopped.

13. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device, during which at least one articulation angle between a longitudinal axis of the tractor unit and a longitudinal axis of the trailer is continuously regulated, and wherein a driving direction and/or a driving speed (v1 to v4) of the big rig are predefined on the touchscreen of the touchscreen device prior to starting to drive.

14. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device, during which at least one articulation angle between a longitudinal axis of the tractor unit and a longitudinal axis of the trailer is continuously regulated, and wherein the tractor unit comprises at least one transceiver system, which is electrically connected to the control means of the tractor unit and which is suitable for communicating with a transceiver system of the touchscreen device.

15. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device during which at least one articulation angle between a longitudinal axis of the tractor unit and a longitudinal axis of the trailer is continuously regulated, and wherein at least one predefined driving direction, a predefined driving speed (v1 to v4), a target articulation angle $\phi_{TARGET}$ and an activation status are transmitted from the touchscreen device to the control means of the tractor unit.

16. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device, during which at least one articulation angle between a longitudinal axis of the tractor unit and a longitudinal axis of the trailer is continuously regulated, and wherein the big rig comprises multiple trailers, and wherein additionally at least one articulation angle between the longitudinal axes of the respective trailers that are coupled to each other are continuously regulated when the big rig is being driven automatically.

17. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link to a touchscreen device so that automatic driving of the big rig is remotely controlled by way of the touchscreen device, during which at least one articulation angle between a longitudinal axis of the tractor unit and a longitudinal axis of the trailer is continuously regulated, and wherein the at least one articulation angle is automatically regulated during driving by way of a steering system of the electronically actuatable drive train of the tractor unit.

18. A touchscreen device which for use in controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit has a wireless communication link,
wherein the touchscreen device is configured to link to the control means by said wireless communication link; and
wherein the touchscreen device is configured to provide remote control for automatic driving of the big rig, during which at least one articulation angle between a longitudinal axis of the tractor unit and a longitudinal axis of the trailer is continuously regulated.

19. A drive control system for a big rig comprising a tractor unit and one or more trailers coupled to the tractor unit, in conjunction with a touchscreen device, wherein the tractor unit comprises a drive train electronically actuated by control means of the tractor unit and by way of which the tractor unit is driven automatically, and wherein the control means of the tractor unit has a wireless communication link to the touchscreen device so that automatic driving of the big rig is remotely controlled by way of the touchscreen device, during which at least one articulation angle between a longitudinal axis of the tractor unit and a longitudinal axis of the at least one trailer is continuously regulated.

20. A method for controlling the driving of a big rig comprising a tractor unit and one or more trailers coupled to the tractor unit, wherein the tractor unit comprises a drive train electronically actuated by control means of the tractor unit and by way of which the tractor unit is driven automatically, and wherein the control means of the tractor unit have a wireless communication link to a touchscreen device so that automatic driving of the big rig is remotely controlled by way of the touchscreen device, the method comprising:
- displaying on a touchscreen of the touchscreen device a graphical representation of the big rig so as to display at least one active part and at least one passive part of the big rig;
- receiving an input at the touchscreen that changes a lateral displacement of said at least one active part;
- wirelessly communicating the input from the touchscreen device to the control means;
- detecting lateral displacement of said at least one active part on the touchscreen to control a lateral movement direction of the big rig; and
- electronically actuating the drive train based on said detected lateral displacement to provide said automatic driving of the tractor unit.

\* \* \* \* \*